United States Patent [19]
Röhm

[11] Patent Number: 5,624,125
[45] Date of Patent: Apr. 29, 1997

[54] KEYLESS POWER-DRILL CHUCK ASSEMBLY

[76] Inventor: Günter H. Röhm, Heinrich-Röhm Strasse 50, D-89567 Sontheim, Germany

[21] Appl. No.: 574,513

[22] Filed: Dec. 19, 1995

[30] Foreign Application Priority Data

Dec. 22, 1994 [DE] Germany ............... 44 45 858.4

[51] Int. Cl.$^6$ ............................................. B23B 31/12
[52] U.S. Cl. ..................... 279/62; 279/140; 279/902
[58] Field of Search ................. 279/60–65, 140, 279/902

[56] References Cited

U.S. PATENT DOCUMENTS

| | | |
|---|---|---|
| 4,272,087 | 6/1981 | Rohm ............................ 279/62 |
| 5,145,192 | 9/1992 | Rohm ............................ 279/140 |
| 5,236,206 | 8/1993 | Rohm ............................ 279/60 |

FOREIGN PATENT DOCUMENTS 0195503  9/1985  European Pat. Off. .

Primary Examiner—Steven C. Bishop
Attorney, Agent, or Firm—Herbert Dubno; Andrew Wilford

[57] ABSTRACT

A drill assembly has a drill housing, a spindle projecting from the housing along an axis and rotatable about the axis, a chuck body fixed on the spindle, jaws on the chuck body, and a rotatable tightening body. The jaws move radially together on rotation of the tightening body in the forward direction on the chuck body and radially apart on rotation of the tightening body in the reverse direction on the chuck body. A setting element rotationally fixed on the drill housing is displaceable axially on the chuck body between axially offset end positions and formations between the setting element and the tightening body rotationally couple the setting element with the tightening body only in one of the end positions of the setting element. A latching element on one of the bodies can move between a locking position engaging the other of the bodies and arresting the tightening body rotationally on the chuck body and an unlocking position disengaged from the other body. A spring urges the latching element into the locking position and interengaging formations on the latching and setting elements displace the latching element into the unlocking position when the setting element is in the one end position so that in the one end position of the setting element the tightening body is rotationally locked to the drill housing and in the other end position of the setting element the tightening body is rotationally locked to the chuck body.

7 Claims, 2 Drawing Sheets

KEYLESS POWER-DRILL CHUCK ASSEMBLY

FIELD OF THE INVENTION

The present invention relates to a power drill. More particularly this invention concerns a keyless chuck for such a drill.

BACKGROUND OF THE INVENTION

A standard drill has a drill housing, a spindle projecting from the housing along an axis and rotatable about the axis, a chuck body rotatably fixed on the spindle, respective jaws on the chuck body, and a tightening body rotatable on the chuck body about the axis in a forward direction and in a reverse direction. Formations interconnecting the chuck body, jaws, and tightening body can move the jaws radially together on rotation of the tightening body in the forward direction on the chuck body and radially apart on rotation of the tightening body in the reverse direction on the chuck body. A setting element rotationally fixed on the drill housing displaceable axially on the chuck body between axially offset end positions and further formations between the setting element and the tightening body rotationally couple the setting element with the tightening body only in one of the end positions of the setting element.

Thus with this system the setting element is moved into its one end position, normally an axially forward position, and the drill's motor is actuated in the appropriate direction to tighten or loosen the chuck, as the setting element locks the tightening ring to the drill housing. Thus the user need exert no torque himself or herself to tighten or loosen the drill.

According to European 0,195 503 the setting element is an axially displaceable sleeve surrounding the chuck body that is pushed forward against a spring and held in place while the drill is operated for the tightening or loosening torque. When pushed forward teeth on the sleeve engage teeth on the tightening body to rotationally lock the two parts together. These teeth have angled flanks so they cam each other axially apart when the relative torque exceeds a predetermined limit, which normally leads to some chattering of the setting body on the chuck, along with concomitant wear. In addition to being subject to considerable wear, such a chuck has the substantial disadvantage that it can loosen in use, that is the tightening body can reverse rotate on the chuck body during drilling.

In my earlier U.S. Pat. No. 4,272,087 of 9 June 1981 a latching pin is displaceable chordally or secantally in a blind bore of the chuck body and is urged radially outward between teeth of an array of radially inwardly directed teeth on the tightening sleeve. An unlocking element can be rotated on the chuck to retract this pin which otherwise inhibits rotation of the sleeve on the chuck body. Thus this system effectively prevents the chuck from loosening by itself, but requires an extra step to be performed by the user before and after each tightening and loosening operation. If the unlocking element is not reset the chuck can loosen.

OBJECTS OF THE INVENTION

It is therefore an object of the present invention to provide an improved drill assembly.

Another object is the provision of such an improved drill assembly which overcomes the above-given disadvantages, that is which allows the drill's motor to be used for tightening and loosening the chuck, and that automatically locks the chuck once it is tightened.

SUMMARY OF THE INVENTION

A drill assembly has according to the invention a drill housing, a spindle projecting from the housing along an axis and rotatable about the axis, a chuck body rotatably fixed on the spindle, respective jaws on the chuck body, and a tightening body rotatable on the chuck body about the axis in a forward direction and in a reverse direction. Formations interconnect the chuck body, jaws, and tightening body for moving the jaws radially together on rotation of the tightening body in the forward direction on the chuck body and radially apart on rotation of the tightening body in the reverse direction on the chuck body. A setting element rotationally fixed on the drill housing is displaceable axially on the chuck body between axially offset end positions and formations between the setting element and the tightening body rotationally couple the setting element with the tightening body only in one of the end positions of the setting element. A latching element on one of the bodies can move between a locking position engaging the other of the bodies and arresting the tightening body rotationally on the chuck body and an unlocking position disengaged from the other body. A spring urges the latching element into the locking position and interengaging formations on the latching and setting elements displace the latching element into the unlocking position when the setting element is in the one end position so that in the one end position of the setting element the tightening body is rotationally locked to the drill housing and in the other end position of the setting element the tightening body is rotationally locked to the chuck body.

Thus with this system the setting element is actuated to simultaneously couple the tightening sleeve the drill housing and decouple it from the chuck body. Once the tightening or loosening operation is over, the setting element retracts and the latching elements again secure the tightening sleeve to the chuck body, locking in the set position. In fact the operation of the latching element is transparent to the user, that is he or she is not normally even going to be aware of its operation except by noting that the chuck cannot loosen in use.

The one body according to the invention is the chuck body and the tightening body is a tightening sleeve surrounding the chuck body. The spring urges the latching element radially outward. In addition the setting element is formed with an angled cam surface that engages the latch element and presses same radially inward only in the one end position of the setting element. This angled cam surface lies on a frustocone centered on the axis and tapered backward toward the drill housing.

The tightening sleeve and setting element in accordance with this invention have axially interengageable teeth defining radially open gaps. The latching element engages in one of the gaps in the locked position. This latching element is a radially displaceable rod or pin having a head engageable with the tightening sleeve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1A:
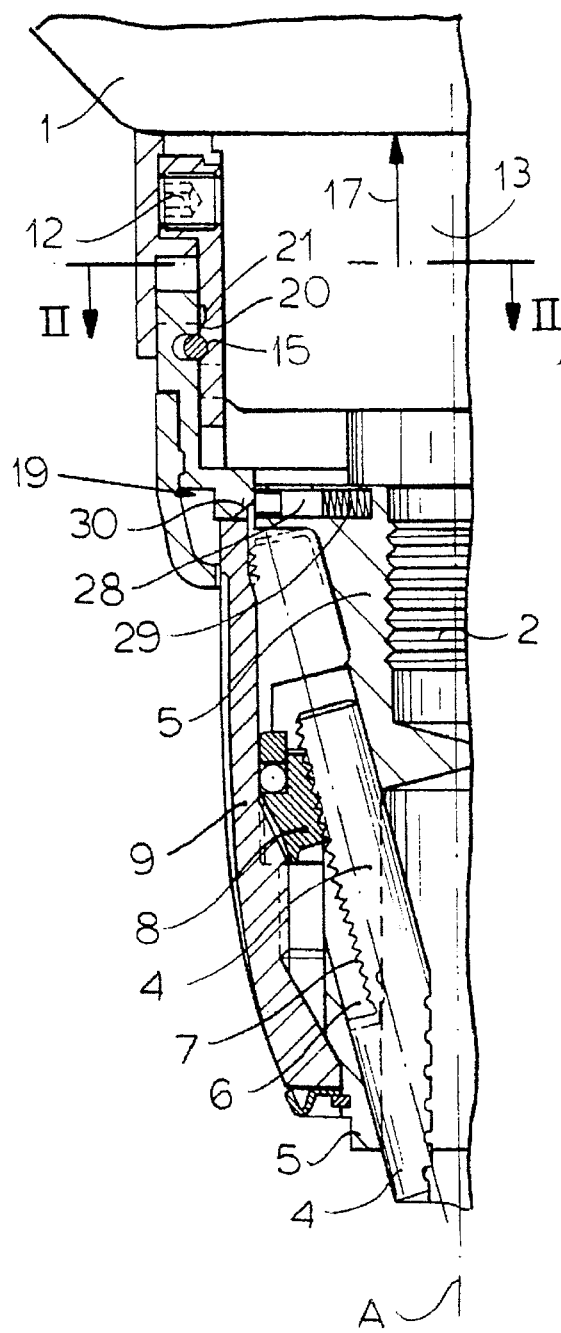
FIGS. 1A and 1B are axial sections through a power-drill chuck assembly according to the invention in a coupled and uncoupled positions, respectively.

As seen in FIG. 1, a power-drill chuck assembly according to the invention has a drill housing 1 from which a spindle 2 projects that is rotatable about an axis A. A chuck 3 has a chuck body 5 threaded onto the end of the spindle 2 and formed with three angled guide passages 6 receiving respective jaws 4 closable on an unillustrated tool as is well known in the art. Each jaw 4 has a back edge formed with a row 7 of teeth that mesh with an internal screwthread of an inner ring 8 fixed rotationally in a tightening sleeve 9 axially fixed but rotatable on the chuck body 5. Rotation of the sleeve 9 in a forward closing direction 14 (FIG. 2) moves the jaws 4 axially forward (down in FIG. 1) and radially inward, and opposite rotation in a reverse opening direction 24' retracts and spreads them.

The chuck 3 according to this invention is opened and closed without the use of a key, but instead uses the torque of the reversibly rotatable spindle 2. To this end a latch shown generally at 19 is provided that has an axially displaceable coupling sleeve 10 that can lock the tightening sleeve 9 to a collar 11 fixed to the drill housing 1 by means of a set screw 12 engaging a neck 13 of the housing 1. As described below the sleeve 10 is arranged so that it moves from the coupling position shown in FIG. 1A to the uncoupled position of FIG. 1B when the torque between the sleeves 9 and 10 exceeds a predetermined level.

More particularly the sleeve 10 is nonrotatably mounted on the housing collar 11 which as mentioned above is fixed on the housing 1 and is formed with teeth 10' that can mesh in the coupling position with complementary teeth 9' of the sleeve 9. In the illustrated embodiment the teeth 9' and 10' are of isosceles-triangular shape with leading and trailing flanks 18 at the same angle. The function of these teeth 9' and 10' is to convert the relative torque between the parts 9 and 10 into an axial force directed backward in direction 17 to separate the parts 9 and 10. It would also be possible to make the teeth 9' and 10' of sawtooth shape so that different torques were necessary on opening and closing to decouple the sleeves 9 and 10.

The sleeve 11 is formed with a pair of axially spaced and radially outwardly open shallow grooves 15 and 21. A spring ring 16 held in a relatively deep and radially inwardly open groove 22 of the sleeve 10 can engage in either of these grooves 15 or 21. When the spring 16 is engaged in the forward groove 21 the sleeve 10 is retained in the coupling position and when in the groove 15 it is held in the decoupled position. It is the force of this spring 16 that must be overcome to move the sleeve 10 between its end positions. The groove 15 has a rearwardly tapering frustoconical edge 20 that extends right to the rear edge of the groove 21 so that when the spring ring 16 moves out of the groove 21 it will naturally contract radially inward due to its own elasticity and fit into the groove 21, pulling the sleeve 10 back. Thus the sleeve 10 will not be able to stay stably in place except when in one of its end positions.

A setting ring or sleeve 23 that is axially fixed but rotatable on the drill housing 1 serves to displace the coupling sleeve 10 between its end positions. To this end the ring 23 has an annular cam surface 24 subdivided into portions 25 extending at a small acute angle to a plane perpendicular to the axis A and portions 26 extending parallel to such a plane. The angled surface portions 25 serve to cam the sleeve 10 forward into the locked position but when aligned with the portions 10 the sleeve is free to move between its end positions. The housing sleeve 11 is also formed with axially forwardly open seats or notches 27 that fit with complementary bumps on the rear end of the sleeve 10 when in the locked position.

In addition according to this invention the chuck body 5 is provided with a plurality of radially displaceable latching rods or elements 28 urged radially outward by respective springs 29 so that heads 32 of these elements engage in gaps 31 between the teeth 9'. The inner edges of the lower ends of the teeth 10' are formed with angled camming surfaces 30 that can press the latching elements 28 inward, out of the spaces 31, when the teeth 9' and 10' are meshed.

Figure 1B:
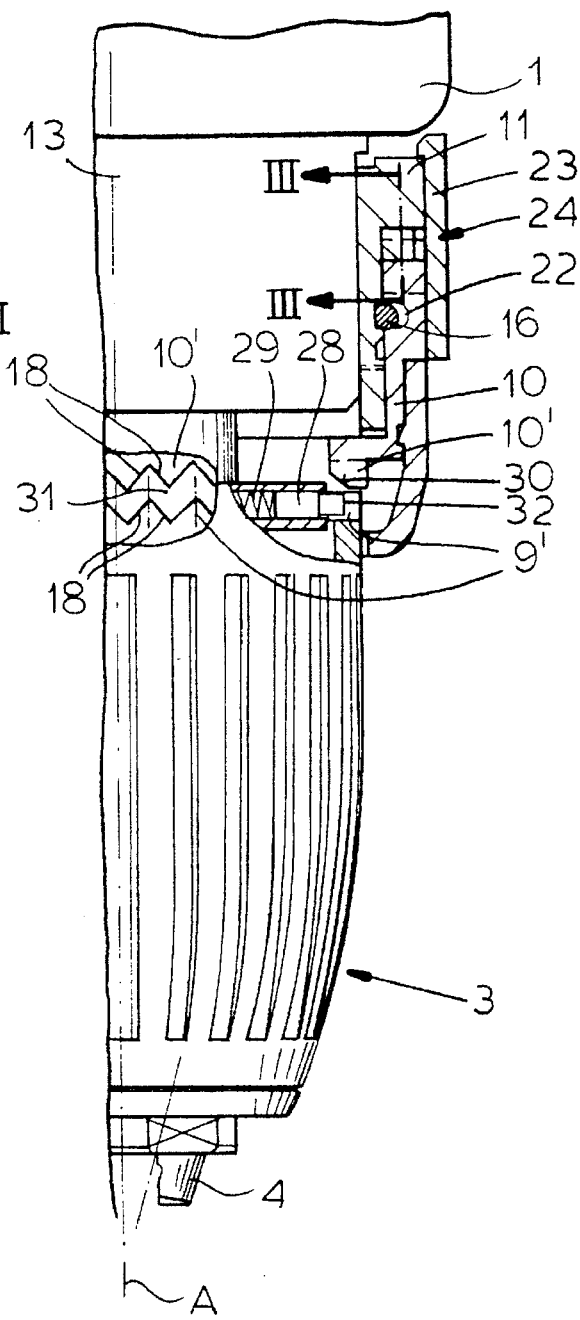
Figure 2:
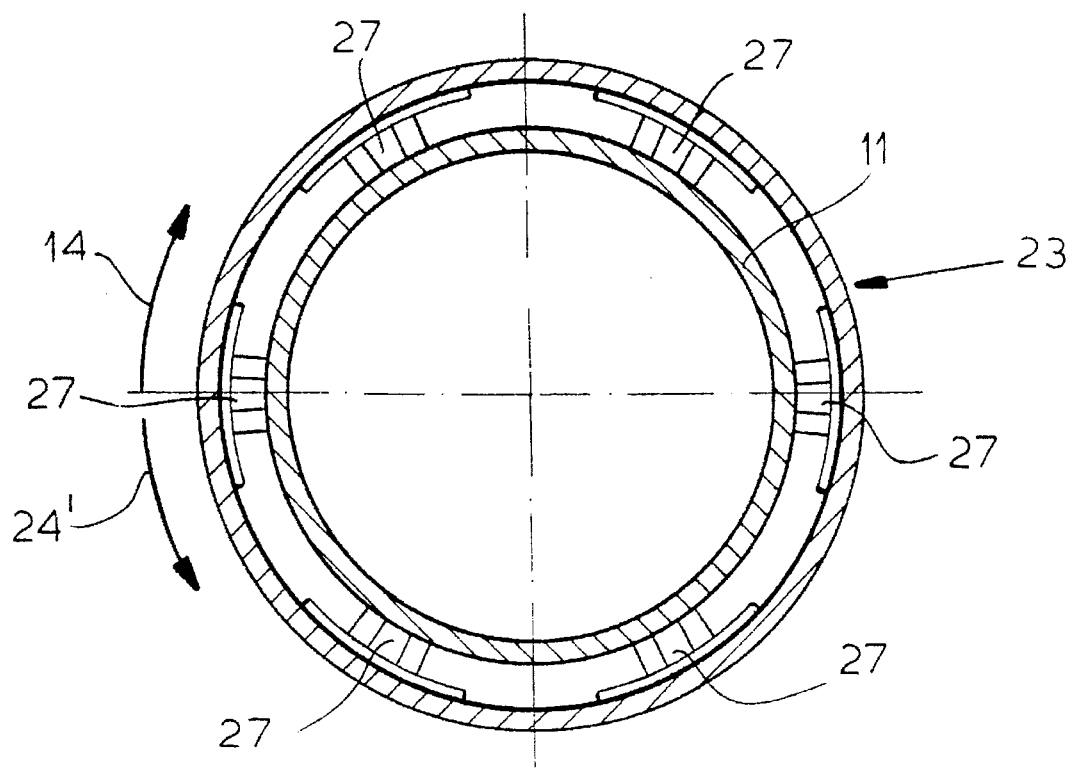
FIG. 2 is a cross section taken along line II—II of FIG. 1.
Figure 3:
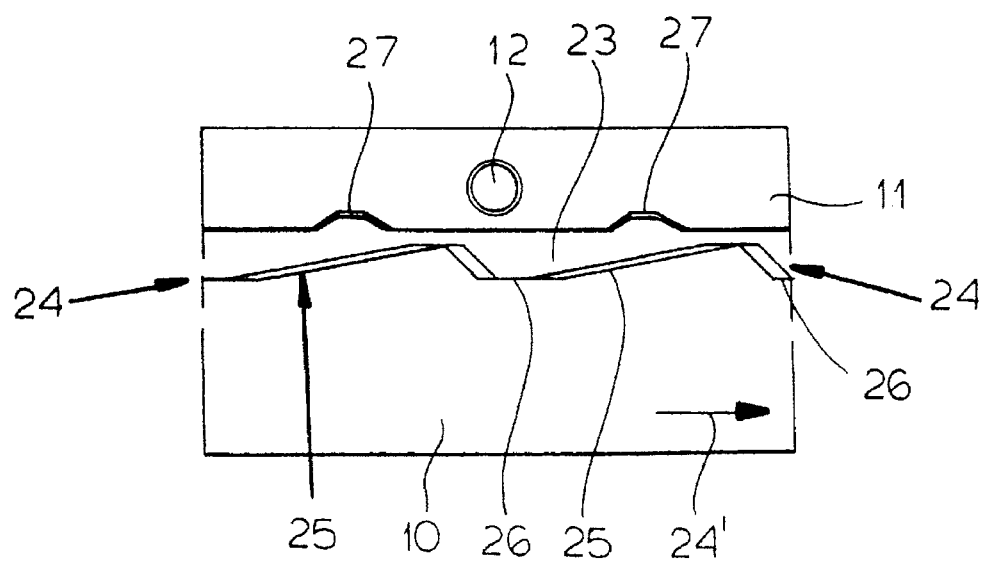
FIG. 3 is a developed side view taken along section line III—III of FIG. 1.

Thus with the system of this invention, when the setting sleeve 23 is twisted to advance the sleeve 10 forward, the tightening sleeve 9 is rotationally coupled via the sleeve 10 to the housing 1 and therefore cannot rotate. Thus in this position rotation of the chuck body 5 by the spindle will serve to open or close the chuck 3, depending on rotation direction. When the torque exerted on the sleeve 9 exceeds a predetermined level determined by the stiffness of the spring ring 16, the teeth 9' and 10' cam axially apart and force the sleeve 23 into its rear position (FIG. 1B).

When, however, the teeth 9' and 10' are out of mesh with each other, the latching elements 28 are free to move radially outward and lock the tightening sleeve 9 relative to the chuck body 5. In this position loosening of the chuck 3 is therefore impossible.

I claim:

1. A drill assembly comprising:

a drill housing;

a spindle projecting from the housing along an axis and rotatable about the axis;

a chuck body rotatably fixed on the spindle;

respective jaws on the chuck body;

a tightening body rotatable on the chuck body about the axis in a forward direction and in a reverse direction;

formations interconnecting the chuck body, jaws, and tightening body for moving the jaws radially together on rotation of the tightening body in the forward direction on the chuck body and radially apart on rotation of the tightening body in the reverse direction on the chuck body;

a setting element rotationally fixed on the drill housing and displaceable axially on the chuck body between axially offset end positions;

formations between the setting element and the tightening body rotationally coupling the setting element with the tightening body only in one of the end positions of the setting element;

a latching element on one of the bodies displaceable between a locking position engaging the other of the bodies and arresting the tightening body rotationally on the chuck body and an unlocking position disengaged from the other body;

a spring urging the latching element into the locking position; and interengaging formations on the latching and setting elements for displacing the latching element into the unlocking position when the setting element is in the one end position, whereby in the one end position of the setting element the tightening body is rotationally locked to the drill housing and in the other end position of the setting element the tightening body is rotationally locked to the chuck body.

2. The drill assembly defined in claim 1 wherein the one body is the chuck body and the tightening body is a tightening sleeve surrounding the chuck body, the spring urging the latching element radially outward.

3. The drill assembly defined in claim 2 wherein the setting element is formed with an angled cam surface that engages the latch element and presses same radially inward only in the one end position of the setting element.

4. The drill assembly defined in claim 3 wherein the angled cam surface lies on a frustocone centered on the axis and tapered backward toward the drill housing.

5. The drill assembly defined in claim 2 wherein the tightening sleeve and setting element have axially interengageable teeth defining radially open gaps, the latching element engaging in one of the gaps in the locked position.

6. The drill assembly defined in claim 2 wherein the latching element is a radially displaceable rod or pin having a head engageable with the tightening sleeve.

7. The drill assembly defined in claim 1 wherein the chuck body is formed with angled guides in which the jaws slide and the tightening ring has a screwthread meshing with screwthreads of the jaws.

* * * * *